US008479276B1

(12) United States Patent
Vaystikh et al.

(10) Patent No.: US 8,479,276 B1
(45) Date of Patent: Jul. 2, 2013

(54) MALWARE DETECTION USING RISK ANALYSIS BASED ON FILE SYSTEM AND NETWORK ACTIVITY

(75) Inventors: Alex Vaystikh, Hod HaSharon (IL); Robert Polansky, Westwood, MA (US); Samir Dilipkumar Saklikar, Bangalore (IN); Liron Liptz, Even Yehuda (IL)

(73) Assignee: EMC Corporation, Hopkinton, MA (US)

( * ) Notice: Subject to any disclaimer, the term of this patent is extended or adjusted under 35 U.S.C. 154(b) by 253 days.

(21) Appl. No.: 12/981,072

(22) Filed: Dec. 29, 2010

(51) Int. Cl.
G06F 7/04 (2006.01)

(52) U.S. Cl.
USPC ............... 726/13; 726/23; 726/24; 726/25; 726/26; 713/160; 713/161; 713/162; 713/163

(58) Field of Classification Search
USPC ........................................... 726/13
See application file for complete search history.

(56) References Cited

U.S. PATENT DOCUMENTS

| 8,108,933 | B2* | 1/2012 | Mahaffey | 726/25 |
| 2009/0094673 | A1* | 4/2009 | Seguin et al. | 726/1 |
| 2010/0115621 | A1* | 5/2010 | Staniford et al. | 726/25 |

* cited by examiner

*Primary Examiner* — Longbit Chai
(74) *Attorney, Agent, or Firm* — BainwoodHaung

(57) ABSTRACT

A virtual machine computing platform uses a security virtual machine (SVM) in operational communications with a risk engine which has access to a database including stored patterns corresponding to patterns of filtered operational data that are expected to be generated during operation of the monitored virtual machine when malware is executing. The stored patterns may have been generated during preceding design and training phases. The SVM is operated to (1) receive raw operational data from a virtual machine monitor, the raw operational data obtained from file system operations and network operations of the monitored virtual machine; (2) apply rule-based filtering to the raw operational data to generate filtered operational data; and (3) in conjunction with the risk engine, perform a mathematical (e.g., Bayesian) analysis based on the filtered operational data and the stored patterns in the database to calculate a likelihood that the malware is executing in the monitored virtual machine. A control action is taken if the likelihood is sufficiently high.

32 Claims, 3 Drawing Sheets

MALWARE DETECTION USING RISK ANALYSIS BASED ON FILE SYSTEM AND NETWORK ACTIVITY

BACKGROUND

The present invention is related to the field of malware detection in computer systems.

Malicious software of "malware" includes so-called Advanced Persistent Threats (APTs) characterized by persistent, background execution with a purpose of stealing sensitive information and/or obtaining unauthorized access to computing resources. Detecting APTs and taking remediation actions has typically been difficult. Traditional anti-malware products, including anti-virus applications, depend on file signatures for detection of malware. Signatures of the executable files of known malware are stored in a database, and detection products scan a target system for files having matching signatures. Such detection techniques can be thwarted by creating variants that have the same or similar functionality but different signatures, a technique which is used to some degree by fraudsters. These detection techniques can also be thwarted by malware that actively seeks to avoid detection by disabling anti-virus software, embedding itself into an operating system kernel, and other methods.

There is a movement in computing toward virtual machine based computing platforms which employ emulated or "virtual" computers (machines) executing on a physical computer. Virtual machines are susceptible of infection with malware in the same manner as physical machines, and traditional anti-malware techniques have the same limitations arising from reliance on file signatures.

SUMMARY

Analysis of different variants of advanced persistent threats (APTs) indicates that they have common behavior. For example, different variants may access the same files on a system. In fact, entirely different APTs can have common behaviors, including file access patterns, which may be usable to identify the presence of these APTs executing on a target machine. Such detection might involve the use of detection software running on a potentially infected machine. However, running detection software within the same operating system as an APT may have may have certain limitations, such as the potential disabling of the detection software by the APT or the potential cloaking of the APT by a hiding technique. These vulnerabilities present challenges to the deployment of malware detection software that operates by observing the behavior of an operating system. These issues can be addressed in a virtual computing environment by making appropriate use of system components outside the operating system of a given (potentially infected) virtual machine. A potential solution is to deploy detection software external to a potentially infected VM, leveraging certain file system and network monitoring functions in a virtual machine monitor or "hypervisor" which can be insulated from anti-detection activity of executing malware.

A method and apparatus are disclosed for detecting and responding to the presence of malware persistently executing in a monitored virtual machine of a virtual computing platform. The technique includes the use of a specialized virtual machine, called a "security virtual machine" (SVM) on the virtual computing platform. The SVM is trusted and assumed to be relatively impervious to infection with malware, either by design and operation or other means (which may include monitoring by a separate SVM). The SVM establishes operational communications with a risk engine which has access to a database including stored patterns corresponding to patterns of filtered operational data that are expected to be generated during operation of the monitored virtual machine when the malware is executing. The stored patterns may have been generated during preceding design and training phases during which the malware was actually executed in order to observe and capture its pertinent behavior. This information may also be updated dynamically during normal operation based on operator feedback.

The security virtual machine is operated to (1) receive raw operational data from a virtual machine monitor of the virtual computing platform, the raw operational data obtained from file system operations and network operations of the monitored virtual machine which are visible to the virtual machine monitor; (2) apply rule-based filtering to the raw operational data to generate filtered operational data; and (3) in conjunction with the risk engine, perform a mathematical (e.g., Bayesian) analysis based on the filtered operational data and the stored patterns in the database to calculate a likelihood that the malware is executing in the monitored virtual machine. virtual machine. In response to the likelihood exceeding a predetermined threshold, a control signal is generated to initiate a control action. In many cases, the system may generate an alert to an operator who can take further action as required. Alternatively, action may be taken to prevent effective ongoing execution of the malware in the monitored virtual machine.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
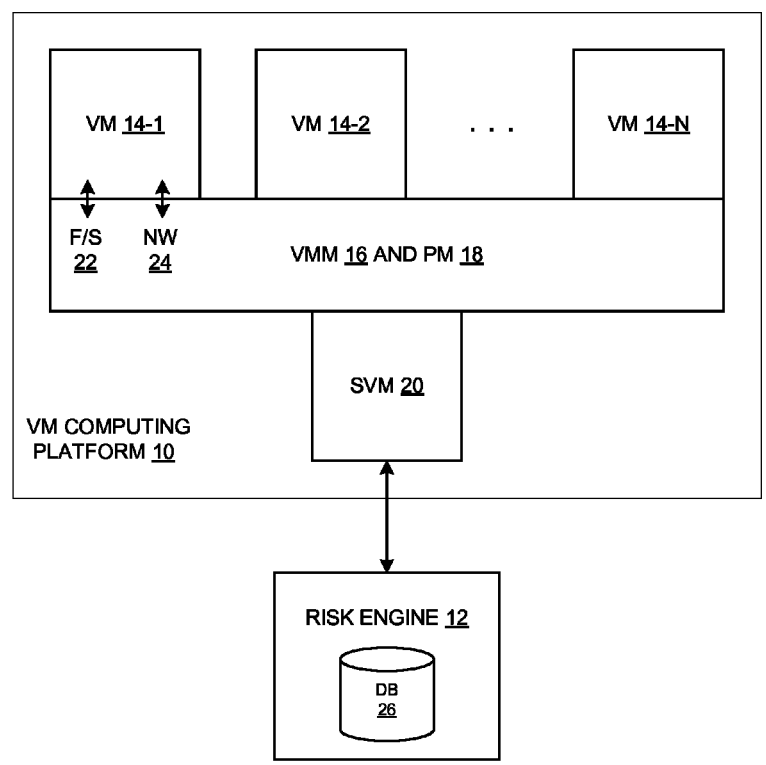
FIG. 1 is a block diagram of a computer system including a virtual machine computing platform coupled to a risk engine.

FIG. 1 shows a data processing system including a virtual machine (VM) computing platform 10 coupled to a risk engine 12. The VM computing platform 10 is a set of one or more physical computers providing data processing using the construct of a "virtual machine", which is software mimicking a physical computing machine. The VM computing platform 10 includes a plurality of virtual machines (VMs) 14 (shown as 14-1 through 14n) which have interfaces to a virtual machine monitor (VMM) 16 and the underlying physical computer or physical machine (PM) 18, which includes processor(s), memory, input/output circuitry etc. as generally known in the art. The VM computing platform 10 also includes a security VM (SVM) 20, which is a VM specialized to perform security-related functions for the VM computing platform 10 as described more fully below. The SVM 20 may be considered as included in "system" software which "system" software which includes the VMM 16.

Each VM 14 engages in file system (F/S) operations 22 and network (NW) operations 24 that require participation of the VMM 16 and PM 18, and thus in that sense are "visible" to the VMM 16. For example, an application seeking to create a file in VM 14-1 invokes a function in the operating system (OS) of that VM 14-1. The OS in turn executes F/S operations 22 (such as allocating blocks of storage for the file) directed to a representation of a storage device that is presented to the OS by the VMM 16. The VMM 16 translates these operations 22 into corresponding operations on a real physical storage device 18 included in the PM 18, in a manner transparent to the VM 14-1. The NW operations 24 are generally handled similarly, i.e., the VM 14-1 directing operations to virtualized network interfaces provided by the VMM 16 and the VMM translating the operations into operations on real physical network interfaces included in the PM 18.

The risk engine 12 is shown as including a database 26. As described in more detail below, the risk engine 12 assists the VM computing platform 10 in detecting the presence of potentially harmful software, referred to as "malware", that may be executing in a VM 14. This detection is performed in part by gathering patterns of operational data during execution of an "infected" VM 14 (i.e., a VM 14 in which a given type of malware is known to be executing) and storing these patterns in the database 26. During operation, the VM computing platform 10 gathers operational data and directs queries to the risk engine 12 to invoke an analysis of the operational data relative to the patterns stored in the database. If a pattern corresponding to a type of malware is sufficiently matched, then a control action can be taken to address the threat posed by the malware, which may include notifying a human system operator or taking some automatic action for example.

Although FIG. 1 shows a direct connection between the SVM 20 and the risk engine 12, it will be appreciated that communications between these components passes through the VMM 16 and PM 18, similar to communications between any of the VMs 14 and other external computers or devices. The organization of FIG. 1 is to highlight the special role of the SVM 20. In this vein, the VMs 14 are referred to as the "monitored" VMs elsewhere in this description, distinguishing them from the SVM 20 which performs a role of monitoring operations of the operations of the VMs 14 to detect possible infection with malware.

Figure 2:
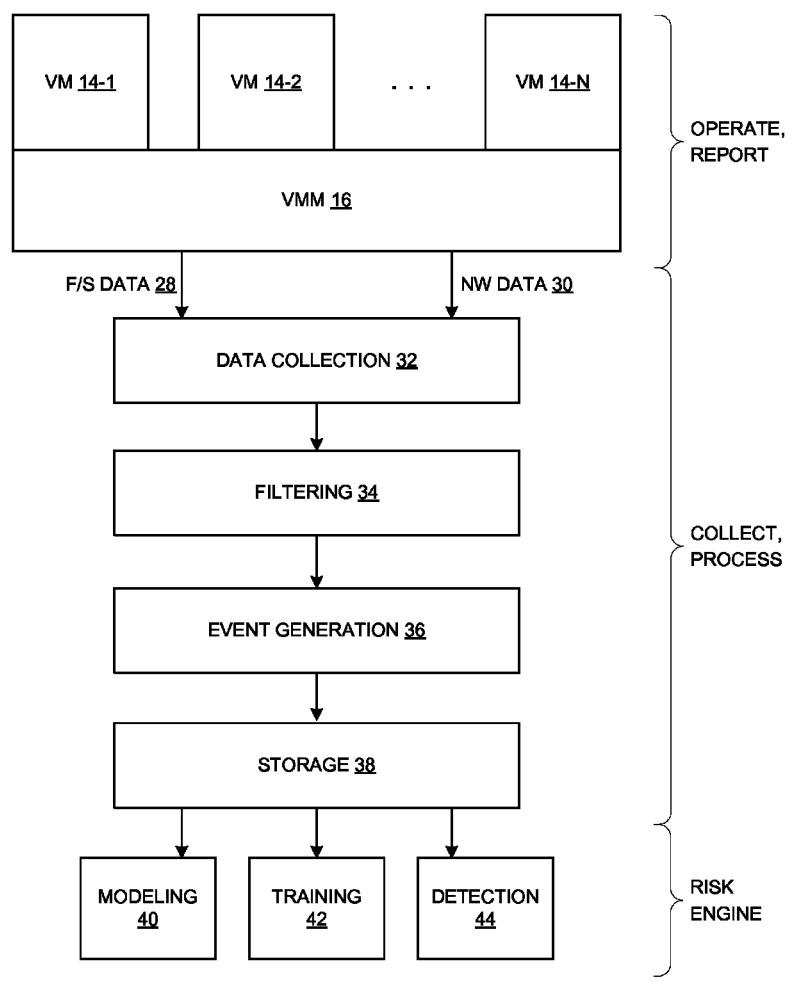
FIG. 2 is a block diagram of components of a virtual machine computing platform.

FIG. 2 illustrates pertinent functionality of the system of FIG. 1. As indicated in the upper part of the Figure, the VMM 16 provides raw operational data, shown as file system data 28 and network data 30, to a data collection function 32. The file system data 28 and network data 30 are obtained from the file system operations 22 and network operations 24 of the VMs 14. The collected data is subjected to rule-based filtering by filtering function 34. The filtered data is used by an event generation function 36 which analyzes the filtered data to identify higher-level aspects of the activity represented by the filtered data. This analysis includes so-called "deep inspection" of network packets and/or data files, for example, to glean application-level information that is pertinent to malware detection as described below. Both filtered data and data representing events is then stored by storage function 38. The functions 32-38 are performed primarily by the SVM 20 in conjunction with the risk engine 12 and database 26.

Deep inspection of network communications packets may include protocol identification and protocol-specific application activity identification. For example, a packet may be identified as being part of a File Transfer Protocol (FTP) exchange, and the protocol-specific application activity may be uploading a file to a specific FTP site for example. Somewhat analogously, deep inspection of data files may include file type identification and application usage identification based on an identified file type.

Part of the value of deep inspection of packets and files is that it can cover the following cases:

1. Malware that monitors legitimate file transactions and duplicates them as network traffic;

2. Malware that monitors legitimate network communications and duplicates them as network communication packets to a separate network destination (e.g., web site); and 3. Detection of keyboard, video, and mouse activity over a remote desktop protocol that is captured by malware and sent as network communication data to a separate network destination (e.g. web site).

As an example, the disclosed technique can be used to detect data being stolen from a web browser through a key logger or screen scraping activity, stored in a file, and then sent to an external computer.

As shown at 40-44, the above functions can be used in three distinct phases. At 40, the functions are used in a modeling or design phase, in which a system designer observes collected data and makes decisions about how the filtering of filter function 34 should be done, for example, or how to define events that can be generated by event generation function 36. During a training phase 42, the VM computing platform 10 is operated in both a malware-free manner as well as in the presence of malware on one or more of the VMs 14, in order to generate and store filtered operational data and events that occur in each of these operating conditions. During training, data and events are tagged according to whether they occur during malware-free operation or during operation in the presence of malware. A detection phase 44 occurs during normal use of a production system in order to provide protection against the possibility of a VM 14 becoming infected with malware. Details of operation in the detection phase 44 are provided below.

As indicated, the file system data 28 and network data 30 are "raw" operational data—they generally include data from all file system operations and network communications of each of the VMs 14. Included within file system operations, for example, are the commands for creating, deleting, opening, closing, writing to and reading from any of the files of the VM's file system. Both the underlying content as well as metadata (or supporting data) such as file handles, file and directory names, access dates, etc. are reported to collection function 32. Included within the network communications are all communications packets received or sent by any of the VMs 14. Again, both the content of the packets as well as packet metadata (network addresses, port identifiers, protocol/service identifiers, etc.) are reported to collection function 32. Both the file system data 28 and network data 30 are accompanied by data which identifies the particular VM 14 whose activity generated the data. Thus, the operations represented by the data 28, 30 are assigned to respective actors (individual VMs 14), enabling a view of multi-step operations of an actor that might characterize operation of a piece of malware.

The filtered operational data can also include other supporting data/information for network communication packets and/or data files. With respect to network communications packets, supporting information can include the time at which a packet is sent or received, and the identity of the process which sent/received it. Filtered operational data may also include a summary of network communication packets and/or data files, which may include a hash of the packet/file contents or the presence of a data pattern within the packet/file.

One of the important aspects of the presently disclosed technique is the focus on detecting so-called "business logic" activity of malware. Conventional malware detection technology can be limited in its reliance on detecting a unique signature of a malware executable file. An attacker can generate variations that execute the same way but have different signatures, thwarting signature-based detection schemes. The present detection technique which focuses on externally visible behavior of the malware (file system and/or network activity, collectively "business logic") does not suffer such a limitation.

Figure 3:
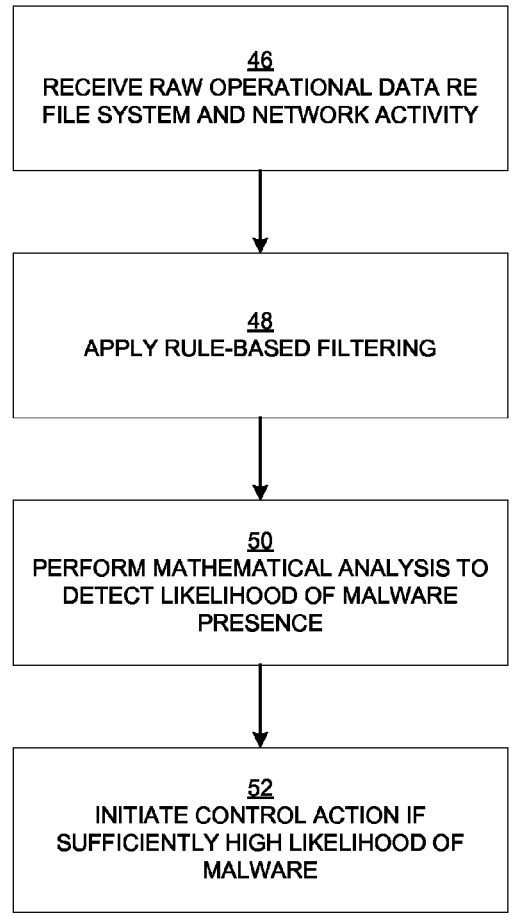
FIG. 3 is a flow diagram depicting operation of the computer system of FIGS. 1 and 2.

FIG. 3 provides a flow diagram of the operation of the SVM 20 in conjunction with the risk engine 12 and database 26 during the detection phase 44. At 46, the SVM 20 receives raw operational data from the VMM 16 regarding file system and network activity or operations of the VMs 14. At 48, the SVM 48 applies rule-based filtering to the raw operational data to generate filtered operational data. This filtering extracts only pertinent parts of the raw operational data, as previously determined during the design phase 40 and training phase 42. The filtered operational data is packaged into one or more queries sent to the risk engine 12 to obtain an assessment of whether the data indicates presence of malware. At 50, the risk engine 12 performs a mathematical (e.g., Bayesian) analysis using the data from the query(ies) and the contents of the database 26 to calculate a likelihood that the data indicates the presence of malware. The results of this analysis are returned to the SVM 20. At 52, the SVM uses the results of the analysis to initiate some type of control action if the likelihood of malware presence is indicated to be high. Generally, the control action is calculated to prevent effective ongoing execution of the known malware in the monitored VN 14. A variety of types of control actions are possible, and may include automatic and/or operator-controlled actions. For example, one control action is generating an alert to notify a system operator of the possible malware infection, malware infection, at which point the system operator will generally take further action. A more automated control action is possible. For example, if the SVM 20 has sufficient information from the filtered operational data to identify a particular process executing on a VM 14 as possible malware, the SVM 20 may be able to invoke a function of the VMM 16 and/or the VM 14 to completely disable execution of the process.

The detection technique described herein can effectively detect known malware that engages in patterns of file system and/or network activity. It can also be effective against malware that may not be specifically known in advance but is related to known malware. Such related malware may be using a subset of the code-base of the known malware, and exhibit similar network communication and file system access patterns. The risk engine 12 considers multiple factors, such as file system access and packet communication patterns, to identify malware. During the training phase, it associates respective weights to these various patterns to create a profile for how a known malware behaves. During the detection phase, the risk engine 12 associates weighted scores to the communications and file access patterns in the filtered operational data, and then compares how close a detected pattern is to the profile of the known malware. It then outputs a likelihood whether a detected pattern is close enough to a known malware pattern to conclude that the monitored VM is infected by malware from the same family. Thus the risk engine 12 can detect previously unknown malware that closely resembles known malware.

The risk engine 12 works on filtered operational data to classify whether the monitored VM 14 is infected with malware. As part of this analysis, it may be realized that more detailed (or different) filtered operational data is dynamically needed to make a better decision. Thus in some embodiments, the filtering rules used by the SVM 20 may be dynamically changed based on inputs from (or outputs of) the risk engine 12.

Additionally, as the system generates alerts, it will receive feedback from a system operator, and based on this feedback, the risk engine 12 dynamically learns which behaviors (alerts) are more or less suspicious. The feedback does not change the types of data the system looks at, but rather it makes the risk engine 12 more accurate and allows it to detect new threats or variations that were not part of the sample pool which the system was initially trained upon. Training/feedback happens by analyzing how a generated alert is handled.

While various embodiments of the invention have been particularly shown and described, it will be understood by those skilled in the art that various changes in form and details may be made therein without departing from the spirit and scope of the invention as defined by the appended claims.

What is claimed is:

1. A method of detecting and responding to presence of malware persistently executing in a monitored virtual machine of a virtual computing platform, comprising:
    establishing operational communications between a security virtual machine, which is separate from said monitored virtual machine, of the virtual computing platform and a risk engine, the risk engine having access to a database which includes stored patterns corresponding to patterns of filtered operational data expected to be generated during operation of the monitored virtual machine when the malware is executing;
    operating the security virtual machine to (1) receive raw operational data from a virtual machine monitor, which can be insulated from anti-detection activity of said executing malware, of the virtual computing platform, the raw operational data obtained from both of file system operations and network operations of the monitored virtual machine which are visible to the virtual machine monitor; (2) apply rule-based filtering to the raw operational data to generate filtered operational data; and (3) in conjunction with the risk engine, perform a mathematical analysis based on the filtered operational data and the stored patterns in the database to calculate a likelihood that the malware is executing in the monitored virtual machine; and in response to the likelihood exceeding a predetermined threshold, generating a control signal to initiate a control action.

2. A method according to claim 1, wherein the control action is selected from generating an alert and taking an action to prevent effective ongoing execution of the malware in the monitored virtual machine.

3. A method according to claim 1, wherein the mathematical analysis is a Bayesian analysis.

4. A method according to claim 1, wherein the raw operational data includes network communications packets and the filtered operational data includes one or more of direct data obtained from the packets, supporting data about the packets, and summary data summarizing contents of the network communications packets.

5. A method according to claim 4, wherein the direct data includes network addresses, the supporting data includes transmission and/or reception times, and the summary data includes a digest or hash of packet contents.

6. A method according to claim 1, wherein the raw operational data includes file system commands and the filtered operational data includes one or more of direct data obtained from data files, supporting data about the data files, and summary data summarizing contents of the data files.

7. A method according to claim 6, wherein the direct data includes file names, the supporting data includes file creation times, and the summary data includes a digest or hash of file contents.

8. A method according to claim 1, wherein the rule-based filtering effects a deep inspection of network communications packets and/or data files to provide filtered operational data describing activity at an application level.

9. A method according to claim 8, wherein the activity includes commands from one or more of hypertext transfer protocol (HTTP) commands and messaging application commands, the HTTP commands being used to retrieve named network resources, the messaging application commands used by a messaging application and being directed to named network users, messaging accounts or addresses.

10. A method according to claim 1, wherein the rule-based filtering identifies combinations of file operations and network operations indicative of unauthorized copying of network communications packet information and/or data file information to an external computer.

11. A method according to claim 10, wherein the combinations include legitimate network or file transactions followed by network traffic containing an illegitimate duplication of data from the legitimate network or file transactions.

12. A method according to claim 1, wherein the rule-based filtering identifies particular patterns of operations on a registry of an operating system of a virtual machine.

13. A method according to claim 1, wherein the database is populated with filtered operational data obtained during a preceding training phase in which the malware is executing on one of the monitored virtual machines.

14. A method according to claim 13, wherein an organization of the database is determined in part by a preceding design phase involving monitoring of the raw operational data during operation of the virtual computing platform.

15. A method according to claim 1, wherein the stored patterns include both positive and negative sample sets, a positive sample set corresponding to the presence of the malware on a virtual machine, a negative sample set corresponding to the absence of the malware on a virtual machine.

16. A method according to claim 1, wherein rules for generating the filtered operational data from the raw operational data are selected based on input criteria provided to the security virtual machine by the risk engine.

17. A virtual computing platform, comprising:
  a physical machine including physical computing resources, the physical computing resources including memory, one or more processors, and input/output circuitry; and
  software executing on the physical machine, the software including a virtual machine monitor, a monitored virtual machine, and a security virtual machine, the security virtual machine being operative, separate from said monitored virtual machine, to establish operational communications with a risk engine, the risk engine having access to a database which includes stored patterns corresponding to patterns of filtered operational data expected to be generated during operation of the monitored virtual machine when the malware is executing, wherein the security virtual machine is further operative to:
  receive raw operational data from the virtual machine monitor, which can be insulated from anti-detection activity of said executing malware, the raw operational data obtained from both of file system operations and network operations of the monitored virtual machine which are visible to the virtual machine monitor;
  apply rule-based filtering to the raw operational data to generate filtered operational data; and
  in conjunction with the risk engine, perform a mathematical analysis based on the filtered operational data and the stored patterns in the database to calculate a likelihood that the malware is executing in the monitored virtual machine; and
  in conjunction with the virtual machine monitor, in response to the likelihood exceeding a predetermined threshold, generating a control signal to initiate a control action.

18. A virtual computing platform according to claim 17, wherein the control action is selected from generating an alert and taking an action to prevent effective ongoing execution of the malware in the monitored virtual machine.

19. A virtual computing platform according to claim 17, wherein the mathematical analysis is a Bayesian analysis.

20. A virtual computing platform according to claim 17, wherein the raw operational data includes network communications packets and the filtered operational data includes one or more of direct data obtained from the packets, supporting data about the packets, and summary data summarizing contents of the network communications packets.

21. A virtual computing platform according to claim 20, wherein the direct data includes network addresses, the supporting data includes transmission and/or reception times, and the summary data includes a digest or hash of packet contents.

22. A virtual computing platform according to claim 17, wherein the raw operational data includes one or more of direct data obtained from data files, supporting data about the data files, and summary data summarizing contents of the data files.

23. A virtual computing platform according to claim 22, wherein the direct data includes file names, the supporting data includes file creation times, and the summary data includes a digest or hash of file contents.

24. A virtual computing platform according to claim 17, wherein the rule-based filtering effects a deep inspection of network communications packets and/or data files to provide filtered operational data describing activity at an application level.

25. A virtual computing platform according to claim 24, wherein the activity includes commands from one or more of hypertext transfer protocol (HTTP) commands and messaging application commands, the HTTP commands being used to retrieve named network resources, the messaging application commands used by a messaging application and being directed to named network users, accounts or addresses.

26. A virtual computing platform according to claim 17, wherein the rule-based filtering identifies combinations of file operations and network operations indicative of unauthorized copying of network communications packet information and/or data file information to an external computer.

27. A virtual computing platform according to claim 26, wherein the combinations include legitimate network or file transactions followed by network traffic containing an illegitimate duplication of data from the legitimate network or file transactions.

28. A virtual computing platform according to claim 17, wherein the rule-based filtering identifies particular patterns of operations on a registry of an operating system of a virtual machine.

29. A virtual computing platform according to claim 17, wherein the database is populated with filtered operational data obtained during a preceding training phase in which the malware is executing on one of the monitored virtual machines.

30. A virtual computing platform according to claim 29, wherein an organization of the database is determined in part by a preceding design phase involving monitoring of the raw operational data during operation of the virtual computing platform.

31. A virtual computing platform according to claim 17, wherein the stored patterns include both positive and negative sample sets, a positive sample set corresponding to the presence of the malware on a virtual machine, a negative sample set corresponding to the absence of the malware on a virtual machine.

32. A virtual computing platform according to claim 17, wherein rules for generating the filtered operational data from the raw operational data are selected based on input criteria provided to the security virtual machine by the risk engine.

* * * * *